United States Patent
Hasegawa et al.

(10) Patent No.: US 6,928,261 B2
(45) Date of Patent: Aug. 9, 2005

(54) MUSIC DATA DISTRIBUTION SYSTEM AND METHOD, AND STORAGE MEDIUM STORING PROGRAM REALIZING SUCH METHOD

(75) Inventors: Yutaka Hasegawa, Shizuoka-Ken (JP); Takashi Kunii, Shizuoka-Ken (JP)

(73) Assignee: Yamaha Corporation, Shizuoka-ken (JP)

(*) Notice: Subject to any disclaimer, the term of this patent is extended or adjusted under 35 U.S.C. 154(b) by 495 days.

(21) Appl. No.: 10/035,615

(22) Filed: Nov. 7, 2001

(65) Prior Publication Data

US 2002/0056117 A1 May 9, 2002

(30) Foreign Application Priority Data

Nov. 9, 2000 (JP) ........................................ 2000-341899

(51) Int. Cl.[7] .................................................. H04H 1/00
(52) U.S. Cl. .................. 455/3.01; 455/412.1; 455/3.06; 380/255; 704/222
(58) Field of Search ............................... 455/3.01, 3.06, 455/66.1, 344, 3.02, 3.03, 3.04, 3.05, 26.1, 132, 149, 272; 380/255; 704/222; 340/825.25, 825.27; 381/4, 3, 77

(56) References Cited

U.S. PATENT DOCUMENTS

| | | | | |
|---|---|---|---|---|
| 5,572,442 A | * | 11/1996 | Schulhof et al. ............ 709/219 |
| 5,636,276 A | | 6/1997 | Brugger | |
| 5,732,324 A | * | 3/1998 | Rieger, III .................. 455/3.01 |
| 6,253,246 B1 | * | 6/2001 | Nakatsuyama ............... 709/233 |
| 6,271,455 B1 | * | 8/2001 | Ishigaki et al. ................ 84/605 |
| 6,507,727 B1 | * | 1/2003 | Henrick ..................... 455/3.06 |
| 6,714,797 B1 | * | 3/2004 | Rautila ..................... 455/552.1 |

FOREIGN PATENT DOCUMENTS

| | | |
|---|---|---|
| EP | 0 755 056 A2 | 1/1997 |
| EP | 1 073 034 A2 | 1/2001 |
| FR | 2 782 563 | 2/2000 |
| WO | 01/16931 A1 | 3/2001 |

OTHER PUBLICATIONS

Chinese Publication, No. CN 1283060A—1 Page.

* cited by examiner

Primary Examiner—Tilahun Gesesse
(74) Attorney, Agent, or Firm—Harness, Dickey & Pierce, P.L.C.

(57) ABSTRACT

A music data distribution system for distributing music data to an external device connected to a network, comprises: a storage device that stores first music data; a receiver that receives a music data distribution request from the external device connected to the network, the music data distribution request comprising at least music data identification information and music data quality information; a reading device that reads the first music data from said storage device in accordance with the music data identification information; a quality converter that converts the first music data into second music data having a quality different from the first music data in accordance with the music data quality information; and a transmitter that transmits the first or the second music data to the external device in accordance with contents of the music data distribution request.

9 Claims, 9 Drawing Sheets

FIG.6A

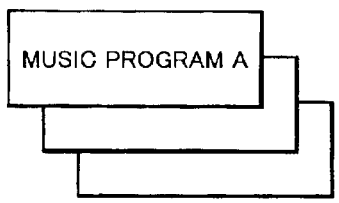

FIG.6B

| FOR MOBILE PHONE | TERMINAL PRODUCT TYPE | HIGH QUALITY | MIDDLE QUALITY | LOW QUALITY |
|---|---|---|---|---|
| FOR ELECTRONIC MUSICAL INSTRUMENT | MOBILE PHONE AA01 | × | × | ○ |
| | MOBILE PHONE AB01 | × | ○ | ○ |
| | ⋮ | ⋮ | ⋮ | ⋮ |
| | MOBILE PHONE ZZ99 | ○ | ○ | ○ |

FIG.6C

| FOR MOBILE PHONE | CONVERSION QUALITY TYPE | HIGH QUALITY | MIDDLE QUALITY | LOW QUALITY |
|---|---|---|---|---|
| FOR ELECTRONIC MUSICAL INSTRUMENT | REPRODUCTION PART NUMBER | 4 | 2 | 1 |
| | PITCHBEND | ○ | × | × |
| | TONE COLOR | ○ | ○ | × |
| | ⋮ | ⋮ | ⋮ | ⋮ |
| | SCORE | ○ | × | × |
| | PRICE | 150 | 120 | 80 |

FIG.8

| ⟨TYPE OF CONVERSION DATA⟩ | ⟨HIGH QUALITY⟩ | ⟨MIDDLE QUALITY⟩ | ⟨LOW QUALITY⟩ |
|---|---|---|---|
| SOUND PRODUCING TIMING | DATA CONTENTS WITH RHYTHMICAL SENSE AND WITHOUT ANY RESTRICTION | DATA CONTENTS WITH RESTRICTION OF RESOLUTION AND WITH RHYTHMICAL SENSE | DATA CONTENTS WITHOUT RHYTHMICAL SENSE THROUGH QUANTIZATION |
| LENGTH OF MUSIC PROGRAM | PERFECT MUSICAL PROGRAM WITHOUT RESTRICTION | REDUCTION OF INTRODUCTION, INTERLUDE AND ENDING | ONLY ONE CHORUS OR CHASTENED PART |
| DATA AMOUNT | DATA CONTENTS REPRESENTING FINE CHANGE WITHOUT RESTRICTION | DATA CONTENTS WITH RESTRICTION OF TIME AND VALUE | REMOVE ALL DATA CONTENTS REPRESENTING CHANGE |
| TONE COLOR SETTING | FINE PARAMETER SETTING, USING TONE COLOR OF HIGH SOUND QUALITY | NO PARAMETER SETTING, USING TONE COLOR OF HIGH SOUND QUALITY | NO PARAMETER SETTING, USING TONE COLOR OF LOW SOUND QUALITY |
| COMPASS | NO COMPASS RESTRICTION | SOME COMPASS RESTRICTION | COMPASS RESTRICTION |
| NUMBER OF SIMULTANEOUSLY PRODUCED SOUNDS | NO RESTRICTION | SOME RESTRICTION | RESTRICTION |

MUSIC DATA DISTRIBUTION SYSTEM AND METHOD, AND STORAGE MEDIUM STORING PROGRAM REALIZING SUCH METHOD

This application is based on Japanese Patent Application 2000-341899, filed on Nov. 9, 2000, the entire contents of which are incorporated herein by reference.

BACKGROUND OF THE INVENTION

A) Field of the Invention

The present invention relates to a music data distribution system, and more particularly to a music data distribution system for converting music data and distributing the converted music data to an external device via a network.

B) Description of the Related Art

There is a music data distribution system wherein music data of a musical instrument digital interface (MIDI) format, an MPEG Layer 3 (MP3) format or the like capable of being reproduced by electronic musical instruments, computers and the like can be purchased by downloading from a server via a network such as the Internet, instead of purchasing music data recorded in a recording medium such as a CD-ROM at stores.

In such a data distribution system, the music data is likely to be prepared in only one quality. Therefore, a user who just needs a low quality data sometimes needs to buy a high quality data for an expensive price.

The quality of music data includes not only the sound quality of reproduced music, but also the amount of information contained in the music data. The information contained in the music data includes score data corresponding to the music data, data for controlling a tone generator, and the like. In this specification, music data containing a larger amount of information is called music data of a high quality or high quality music data.

Music data is often sold separately for mobile phones and electronic musical instruments. Generally, music data for mobile phones and electronic musical instruments is recorded in different file formats, so that one cannot reproduce music data for another.

Therefore, the user should purchase music data that can be reproduced by an apparatus owned by the user. The user is required to search reproducible music data from a large amount of music data. It is also necessary for each user apparatus to access in a manner specific to the apparatus a home page selling reproducible music data.

If music data of various file formats and qualities compatible with various types of apparatuses is to be sold at one home page, a number of files are required to be prepared for each music piece and the memory capacity of the server increases.

If the number of types (qualities and file formats) of music data to be dealt with one home page increases, it becomes more difficult to select reproducible music data by using an apparatus owned by a user, leaving a risk of diminishing purchase desire.

SUMMARY OF THE INVENTION

An object of the present invention is to provide a music data distribution system capable of generating music data corresponding to a plurality types of qualities and presenting them to users, by changing the contents or an amount of information of pre-stored music data.

Another object of the present invention is to provide a music data distribution system capable of distributing music data having a quality matching a user terminal type and reception environment, at a reasonable price.

According to one aspect of the present invention, there is provided a music data distribution system for distributing music data to an external device connected to a network, comprises: a storage device that stores first music data; a receiver that receives a music data distribution request from the external device connected to the network, the music data distribution request comprising at least music data identification information and music data quality information; a reading device that reads the first music data from said storage device in accordance with the music data identification information; a quality converter that converts the first music data into second music data having a quality different from the first music data in accordance with the music data quality information; and a transmitter that transmits the first or the second music data to the external device in accordance with contents of the music data distribution request.

According to another aspect of the invention, there is provided a A music data distribution system for distributing music data to an external device connected to a network, comprises: a storage device that stores first music data; a receiver that receives a music data distribution request from the external device connected to the network, the music data distribution request comprising at least music data identification information and device identification information; a searching device that searches the first music data from said storage device in accordance with the music data identification information; a quality determiner that determines a quality of said music data which can be reproduced by said external device; and a transmitter that transmits information displayed on a display of said external device for promoting purchase of said music data with the quality determined by said quality determiner to said external device.

It is possible to generate music data corresponding to a plurality type of qualities and presenting them users, by changing the contents of music data prepared beforehand.

It is also possible to distribute music data having a quality matching a user terminal type and reception environment, at a reasonable charge.

It is also possible to generate music data corresponding to file formats reproducible by a plurality type of apparatuses, by changing the file format of music data prepared beforehand.

BRIEF DESCRIPTION OF THE DRAWINGS

FIGS. 6A to 6C are diagrams showing examples of music data, a correspondence table and a conversion table.

FIG. 8 is a diagram showing an example of the conversion table.

DETAILED DESCRIPTION OF THE PREFERRED EMBODIMENTS

Figure 1:
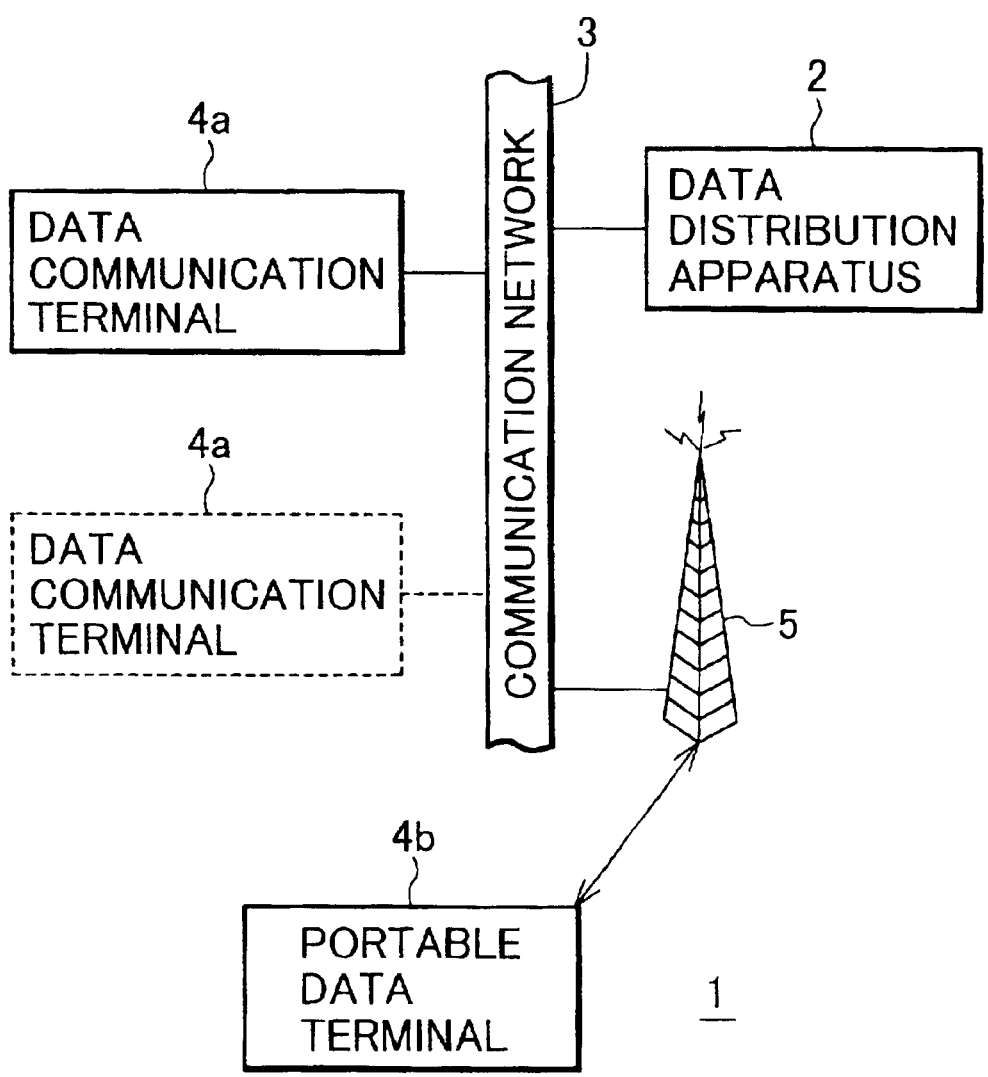
FIG. 1 is a block diagram showing an example of the structure of a music data distribution system 1 according to an embodiment of the invention.

FIG. 1 is a block diagram showing an example of the structure of a music data distribution system 1 according to an embodiment of the invention. This system 1 has a data distribution apparatus (management server) 2 and a user terminal 4 interconnected by a communication network 3 such as the Internet or communication lines. The user terminal 4 may be a data communication terminal 4a for wired communications or a portable communication terminal (portable data terminal) 4b for wireless communications.

The data distribution apparatus 2 is, for example, a World Wide Web (WWW) server on the Internet constituted of a computer PC or the like, and stores a large amount of music data as will be later described. This data distribution apparatus 2 provides pay services for distributing stored music data to the user terminal 4 upon request from the user.

The user terminal 4 may be the data communication terminal 4a or portable data terminal 4b, and can be connected to the communication network 3 such as local area networks (LAN), the Internet, and telephone lines. The user terminal 4 is connected to the management server 2 via the communication network 3 to download desired music data from the management server 2. If the portable data terminal 4b is used, this terminal is connected to a wireless base station 6 via a wireless communication channel 5, and the base station 6 is connected to the management server 2 via the communication network 3.

The user terminal 4 as a client transmits a command (music data request information) for requesting to download music data or the like to the management server 2 via the communication network 3. Upon reception of this music data request information, the management server 2 distributes the requested music data or the like to the user terminal via the communication network 3. The user terminal 4 receives the music data or the like and stores it in an external storage unit 16 or a RAM 13 shown in FIG. 2 to be described later, to thus complete the download of music data or the like.

As will be later detailed, when the music data is downloaded, the management server 2 can convert the file format of stored music data into the file format reproducible at the user terminal, and can change the contents or information amount (quality) of music data so as to satisfy user desire.

Figure 2:
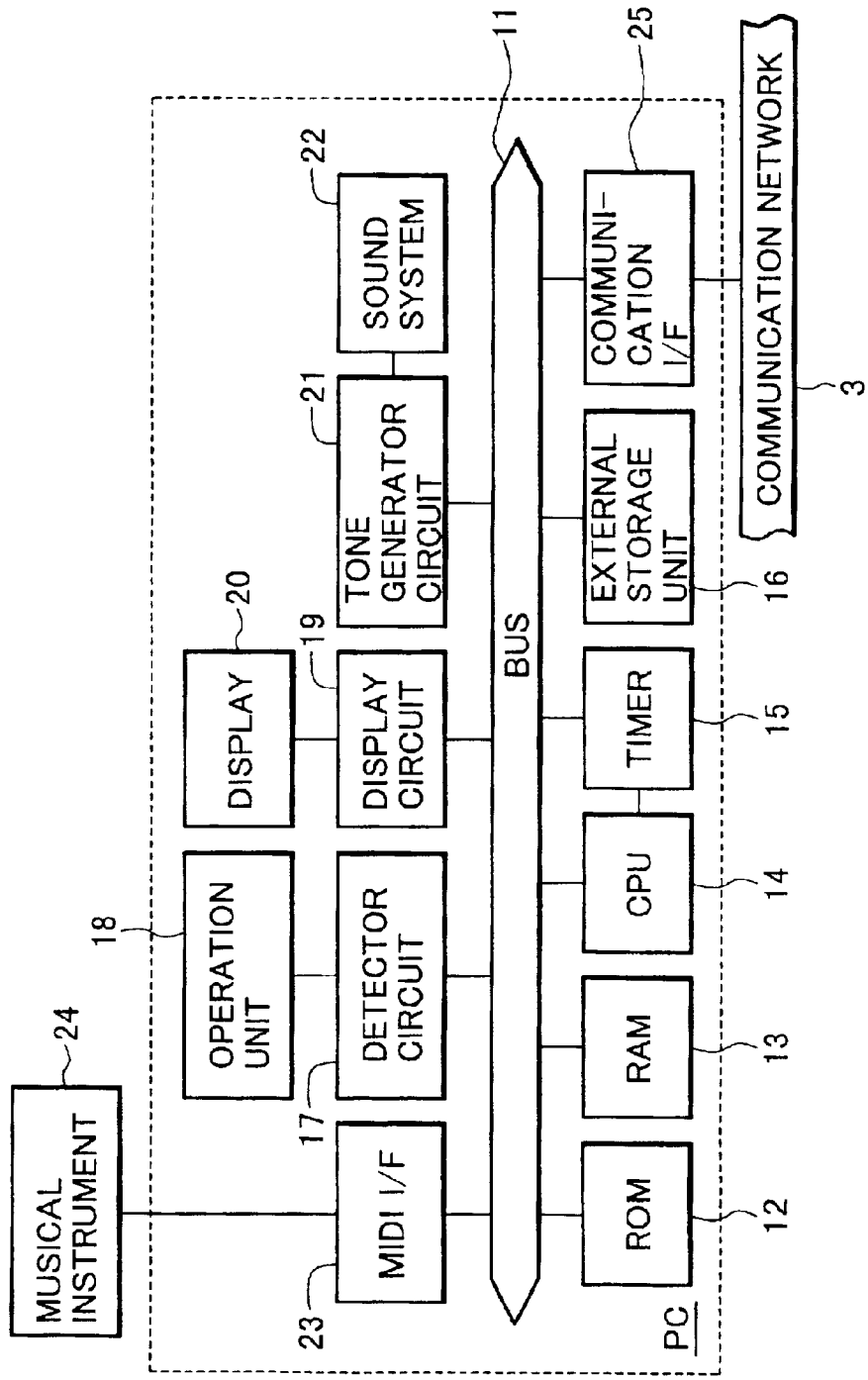
FIG. 2 is a block diagram showing the specific hardware structure of a computer PC constituting a user terminal 4 or management server 2.

FIG. 2 is a block diagram showing the specific hardware structure of a computer PC constituting the user terminal 4 or management server 2. The structure of the computer PC will be described by taking as an example the computer PC used as the data communication terminal 4a (user terminal 4).

Connected to a bus 11 are a detector circuit 17, a display circuit 19, a RAM 13, a ROM 12, a CPU 14, an external storage unit 16, a communication interface 25, an MIDI interface 23, a timer 15 and a tone generator circuit 21.

A user can enter necessary information such as a music program name and singer name to be downloaded, by using an operation unit (input means) 18 connected to the detector circuit 17. For example, the operation unit 18 may be any unit capable of outputting a signal corresponding to a user input, such as a mouse, a keyboard for entering characters and the like, a keyboard for musical performance, a joy stick, and a switch. A plurality of operation units may be connected.

The display circuit 19 is connected to a display 20 and can display various informations on the display 20.

The external storage unit 16 has an interface and is connected via the interface to the bus 11. The external storage unit 16 may be a floppy disc drive (FDD), a hard disc drive (HDD), a magneto optical disc (MO) drive, a compact disc read-only memory (CD-ROM) drive, a digital versatile disc (DVD) drive or the like. The external storage unit 16 may store a plurality of music data sets, a program for realizing the functions of the embodiment, and the like.

RAM 13 has flags, registers, buffers and working areas for CPU 14 for storing music data such as MIDI performance data. ROM 12 can store various parameters, control programs, the program for realizing the embodiment functions, and other data. The programs and other data are not required to be stored duplicately in the external storage unit 16. CPU 14 performs calculations or controls in accordance with the control programs stored in ROM 12 or external storage unit 16.

The timer 15 connected to CPU 14 and the bus 11 supplies CPU 14 with a main clock signal, interrupt timing and the like.

Music data and the like are stored in the external storage unit 16, RAM 13 or ROM 12. Music data can be transferred to and from the external via the communication interface 25.

The MIDI interface 23 is used for connection to other musical instruments, audio apparatuses, computers or the like, and can transmit/receive at least MIDI signals. The MIDI interface 23 is not limited only to a dedicated MIDI interface, but it may be other general interfaces such as RS-232C, universal serial bus (USB) and IEEE1394. In this case, data other than MIDI message data may be transmitted/received at the same time.

The electronic musical instrument 24 is an audio apparatus, musical instrument or the like connected to the MIDI interface 23. The type of an electronic musical instrument is not limited only to a keyed instrument, but other types may also be used such as a stringed instrument, a wind instrument and a percussion instrument. The electronic musical apparatus is not limited only to an electronic musical instrument of the type that the components thereof such as a tone generator and an automatic performance apparatus are all built in one integrated body, but these components may be discrete and interconnected by communication devices such as MIDI and various networks. The tone generator circuit 21 generates tone signals in accordance with supplied MIDI signals or the like, and supplies the generated tone signals to a sound system 22. The sound system 22 includes a D/A converter and speakers, and converts supplied digital tone signals into analog tone signals to produce sounds.

The tone generator circuit 21 may be of any type, such as a waveform memory type, an FM type, a physical model type, a harmonics synthesis type, a formant synthesis type, and an analog synthesizer type having a voltage controlled oscillator (VCO)+a voltage controlled filter (VCF)+a voltage controlled amplifier (VCA).

The tone generator circuit 21 is not limited only to those made of hardware, but may be realized by a digital signal processor (DSP) and a micro program, by a CPU and a software program, or by a sound card.

One tone generator circuit may be used time divisionally to form a plurality of sound producing channels, or a plurality of tone generator circuits may be used to form a plurality of sound producing channels by using one tone generator circuit per one sound producing channel.

The control programs, program realizing the embodiment functions and the like may be stored in a hard disc (HDD)

of the external storage unit 16. By reading the control programs and the like from the hard disc to RAM 13, CPU 14 can perform operations similar to those when the control programs and the like are stored in ROM 12. In this case, addition, version-up and the like of the control programs and the like can be made easy.

The control programs, program for realizing the embodiment functions and the like may be stored in a CD-ROM. The control programs, program for realizing the embodiment functions and the like can be copied from CD-ROM to the hard disc. In this case, addition, version-up and the like of the control programs and the like can be made easy.

The communication interface 25 is connectable to the communication network 3 such as a local area network (LAN), the Internet, and a telephone line. The server is connected via the communication network 3 to download the control programs, the program realizing the embodiment functions, and the like from the server into the external storage unit 16 such as HDD or RAM 13.

If the computer PC is used as the portable data terminal 4b, the MIDI interface 23 and external storage unit are not necessarily required. In this case, the communication interface 25 is required to be connectable to the communication channel by wireless communications. For example, the communication interface 25 can connect a wireless communication channel for mobile phones. The portable data terminal 4b is not limited only to a mobile phone, but it may be any type capable of connecting the communication network 3 by wireless communications.

If the computer PC is used as the management server (data distribution apparatus) 2, the tone generator circuit 21 and the like are not necessarily required. The hardware structure is generally similar to that of the user terminal 4. In this case, a plurality of original music data MO sets are stored in the external storage unit 16 of the management server 2, as shown in FIG. 6A.

The original music data MO is the data for reproducing a music program, which data is generated and recorded in the file format reproducible by an electronic musical instrument. The original music data MO is the data having a plurality of parts and the highest quality. The data of the highest quality contains reproduction parts corresponding in number to the maximum number of parts (e.g., 128 parts) which parts can be reproduced by a high quality music reproducing apparatus, a fine pitch change by pitch-bend data, a tone color change by tone color number data, score data for displaying a detailed score of all parts, and the like. The data of the highest quality may further contain fine setting of tone color contents by parameter setting, a fine tempo change by tempo data, a code progress designation by a code sequence, a fine velocity (sound volume) by velocity data and the like.

In this embodiment, particular data is removed from the original music data MO of the highest quality for electronic musical instruments to thereby create music data MD of various qualities. The file format is converted into the file format reproducible by cellar phones or the like.

Figure 3:
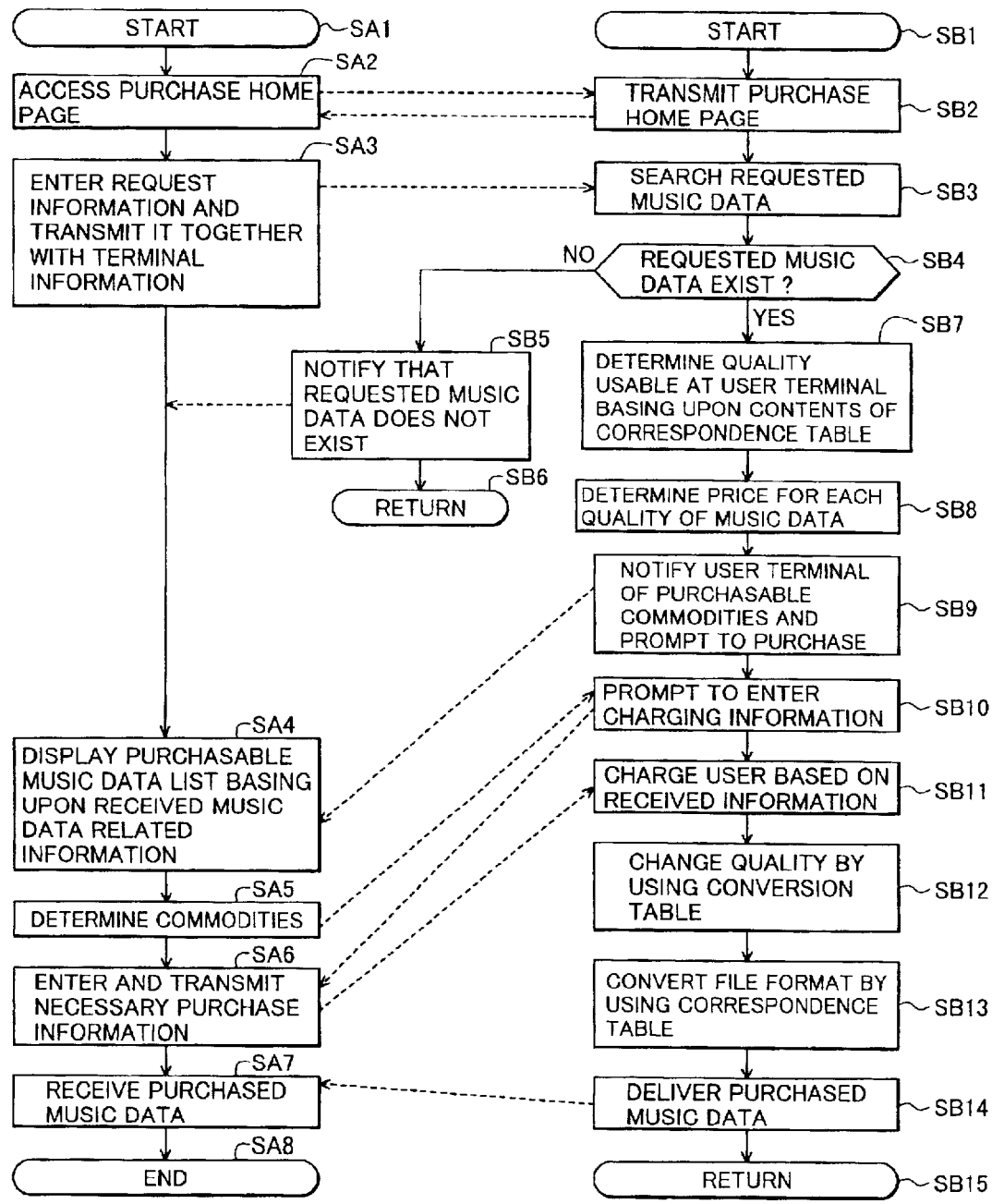
FIG. 3 is a flow chart illustrating a process to be executed by CPU 14 of the management server 2 and user terminal 4 of the music data distribution system of the embodiment.

FIG. 3 is a flow chart illustrating a process to be executed by CPU 14 of the management server 2 and user terminal 4 of the music data distribution system according to the embodiment of the invention. The left part shown in FIG. 3 illustrates the process to be executed by CPU 14 of the user terminal 4, and the right part illustrates the process to be executed by CPU 14 of the management server 2. Broken line arrows show a flow of data or the like to be transferred between the user terminal and management server via the communication network 3 (FIG. 1).

The process on the user terminal side to be executed by CPU 14 of the user terminal 4 shown in the left side of FIG. 3 will be described first.

At Step SA1 the process on the user terminal side starts to thereafter advance to next Step SA2.

Figure 4A:
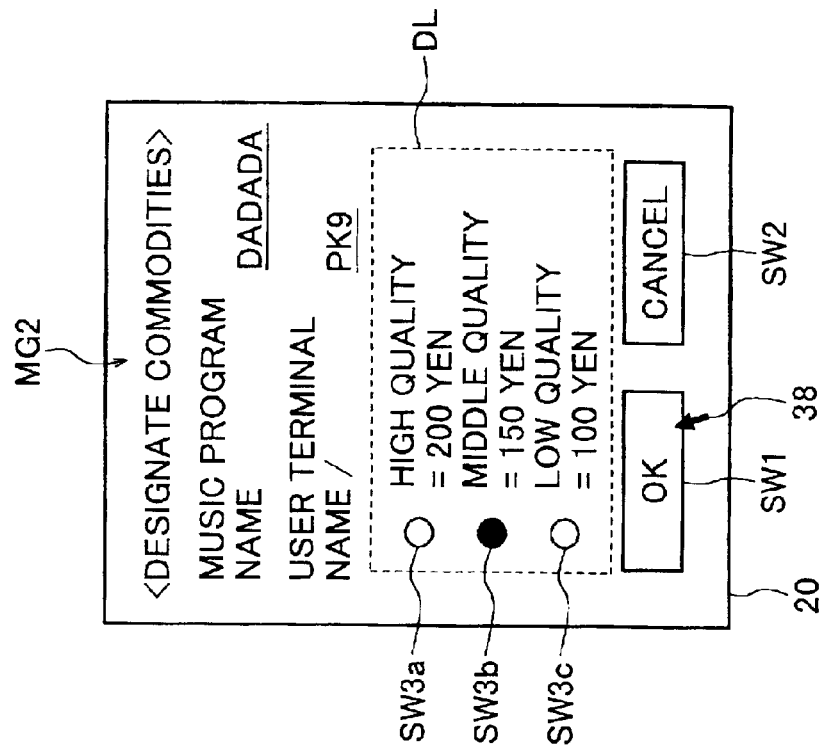
FIGS. 4A to 4D are diagrams showing examples of various display windows used for purchasing music data.

At Step SA2 a user enters a uniform resource locator (URL) of the management server 2 to connect the user terminal to the management server 2 via the Internet (communication network) 3 and download a music data purchase home page display file from the management server 2. As the music data purchase home page display file is downloaded, this home page containing a music program information input window such as shown in FIG. 4A to be described later, is displayed on the display 20 (FIG. 2). Thereafter, the flow advances to next Step SA3.

The music data purchase home page display file is, for example, an HTML format file that can be displayed by a usual Internet browser. This file displays the music program information input window such as shown in FIG. 4A and prompts the user to enter music data request information RI (FIG. 5) necessary for selecting music data or the like. The details of the music program information input window shown in FIG. 4A will be later given.

At Step SA3 the music data request information RI entered by the user as well as terminal information TI specific to the terminal stored beforehand in ROM 12 or the external storage unit 16 of the user terminal, is transmitted to the management server 2. Thereafter, the flow advances to next Step SA4.

Figure 5:
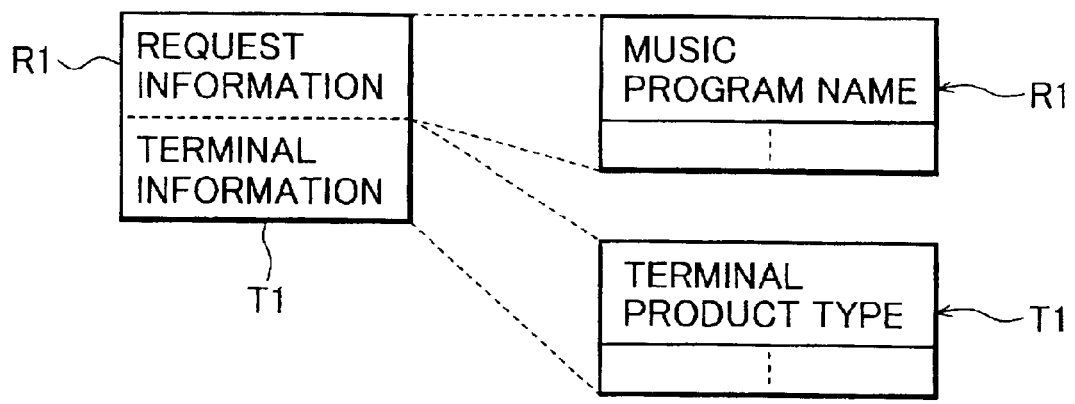
FIG. 5 is a diagram showing request information and terminal information.

The music data request information RI and terminal information TI are integrated as one data block as shown in FIG. 5. The music data request information to be entered by the user contains the information for identifying music data desired to be downloaded, such as a music program name and a singer name of the music data. The terminal information TI is stored beforehand in ROM 12 or the external storage unit 16 of the user terminal 4, and contains the information for identifying the product type of the user terminal 4, such as the product type name specific to the user terminal 4.

Although the terminal information TI is preferably stored in advance in ROM 12 or the external storage unit 16 of the user terminal 4 as described above, a user may enter it manually.

The music data request information RI is entered by using the music program information input window in the music data purchase home page displayed at Step SA2.

Figure 4B:
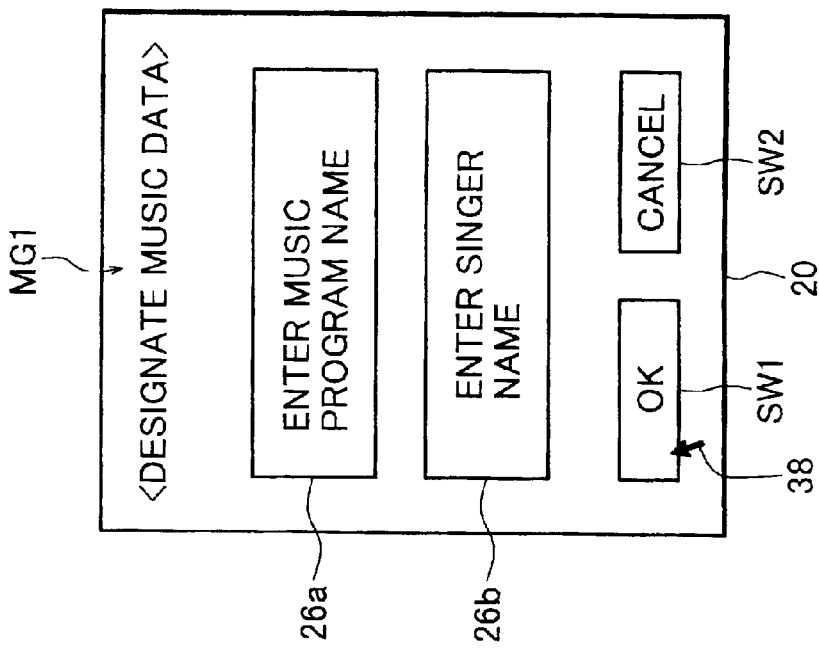

At Step SA4 the user terminal receives music data related information transmitted from the management server 2 at Step SB9 to be described later. In accordance with the received music data related information, a list of purchasable qualities (hereinafter called a quality list) of the music data requested at Step SA3 is displayed on the display 20. Thereafter, the flow advances to Step SA5. The displayed quality list is, for example, a list such as shown in FIG. 4B or 4C to be described later.

At Step SA5 the user is prompted to determine music data (commodity) to be purchased by referring to the quality list displayed at Step SA4. As the user selects the commodity and input the commodity information, the commodity information is transmitted to the management server 2 to thereafter advance to next Step SA6.

Figure 4D:
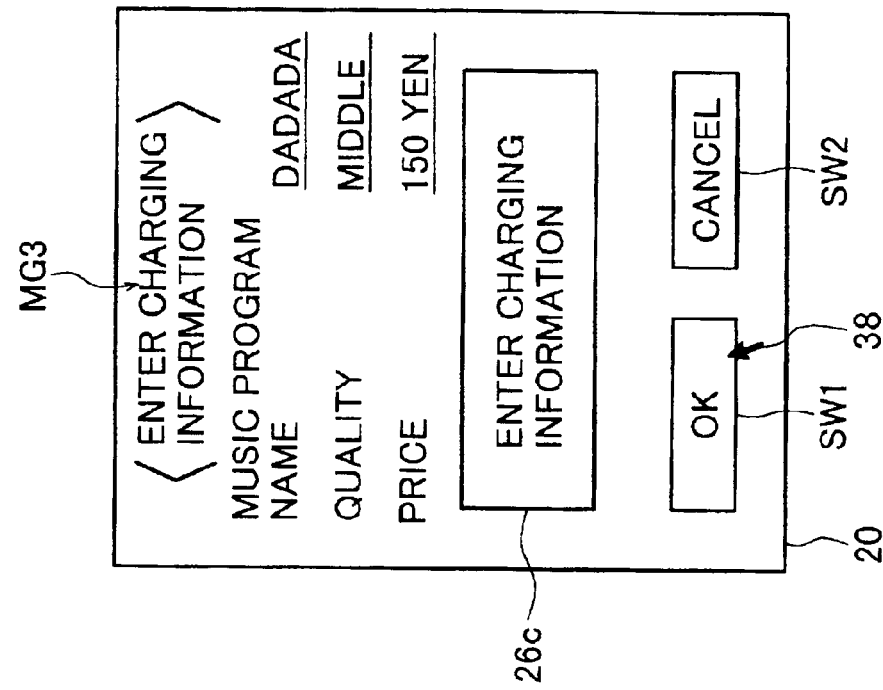
Figure 4C:
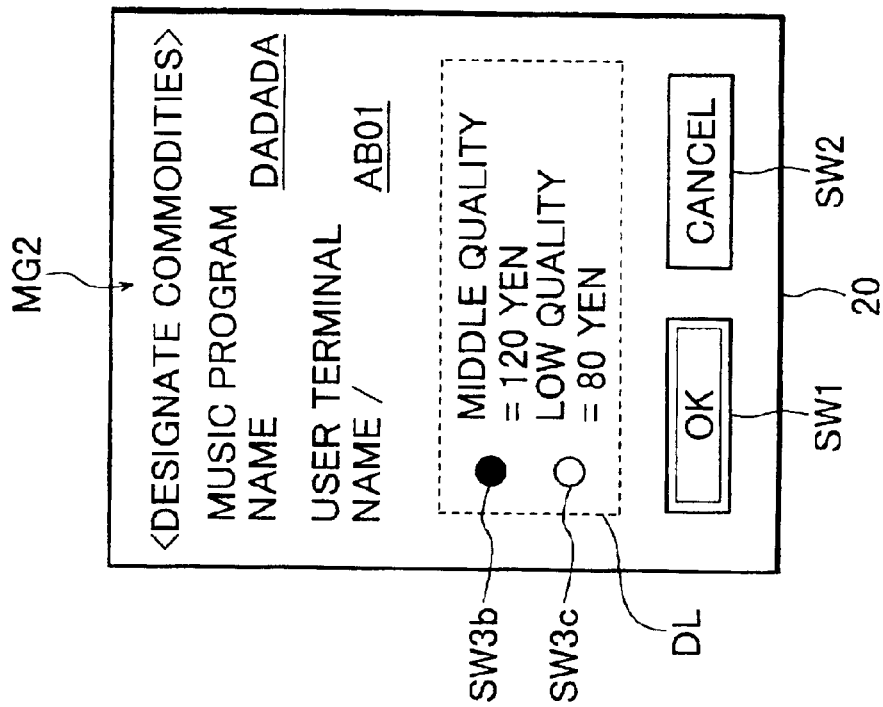

At Step SA6 a charging information input window such as shown in FIG. 4D to be described later is displayed on the display 20 to prompt the user to enter necessary purchase information. As the charging information is entered, this information is transmitted to the management server 2 to thereafter advance to next Step SA7.

The necessary purchase information is the information containing at least charging information. In this embodiment, although the commodity is downloaded immediately thereafter, a storage medium storing the commodity may be mailed. In this case, the user is prompted to enter the charging information as well as the information on the commodity mailing method and the information on delivery such as a mailing date. A user may select one of the downloading and mailing or both may be selected.

If charging is performed by using a credit card, the charging information contains a credit card number, an expiration date, an owner name and the like. If charging is performed by bank transfer or post office transfer, the information contains an address to which a transfer sheet is mailed or an email address to which a transfer sheet is transmitted. If charging is performed by e-cash, the charging information contains e-cash user information.

At Step SA7 the purchased music data is downloaded from the management server 2. After the download, the flow advances to next Step SA8.

At Step SA8, the process on the user terminal side is terminated.

Next, the process on the management server side to be executed by CPU 14 of the management server 2 shown in the right side of FIG. 3 will be described.

At Step SB1 the process on the management server side starts. Thereafter, the process advances to next Step SB2.

At Step SB2 in response to a connection request from the user terminal, the music data purchase home page display file to be received at the user terminal 4 at Step SA2 of the process on the user terminal side is transmitted to the Internet (communication network) 3 to thereafter advance to Step SB3.

At Step SB3 the management server receives the music data request information RI and terminal information TI transmitted from the user terminal 4 at Step SA3 of the process on the user terminal side, and it is checked from the music data request information RI whether the original music data MO corresponding to the music data requested by the user is stored in the external storage unit 16 (FIG. 2). Thereafter, the flow advances to next Step SB4.

At Step SB4 if the check result at Step SB3 indicates that the original music data MO requested by the user is stored in the external storage unit 16 (FIG. 2), then the flow advances to Step SB7 indicated by a YES arrow. If the original music data MO requested by the user is not stored in the external storage unit 16 (FIG. 2), the flow branches to next Step SB5 indicated by a NO arrow.

At Step SB5 the user terminal 4 is notified via the Internet (communication network) 3 of the effect that the music data requested by the user does not exist. Thereafter, the flow advances to next Step SB6.

At Step SB6 the process on the management server side is reset to return to Step SB1 and resume the management server process.

At Step SB7 by referring to a correspondence table shown in FIG. 6B and the terminal information TI received at Step SB3, the management server determines the file format and quality of music data MD reproducible at the user terminal 4 which requested for the music data. Thereafter, the flow advances to next Step SB8.

As shown in FIG. 6B, the correspondence table includes two types of tables for mobile phones and electronic musical instruments (tables are prepared for each reproducible apparatus and each file format). The correspondence table matching the user terminal is selected by referring to the terminal information TI. For example, if the user terminal is a mobile phone (as confirmed by the terminal information TI), the correspondence table matching the mobile phone is used. The correspondence table for the mobile phone stores reproducible qualities for each of portable terminal product types including "mobile phone AA01", "mobile phone AB01", . . . , "mobile phone ZZ99". In FIG. 6B, a symbol "circle" indicates that music data of that quality can be reproduced, and a symbol "cross" indicates that the music data of that quality cannot be reproduced.

For example, the "mobile phone AB01" cannot reproduce music data of the high quality, but it can reproduce music data of the middle and low qualities. In accordance with such information, a list DL shown in FIG. 4C is displayed.

Conversion of the file format is judged from whether the user terminal apparatus (product type) represented by the terminal information TI belongs to (is recorded in) in the table for the mobile phone or the table for the electronic musical instrument. For example, if the user terminal apparatus is recorded in the mobile phone table, the file format is converted into the file format reproducible at the mobile phone.

In this embodiment, the correspondence table is prepared for each reproducible file format. It is not necessarily required to prepare the correspondence table for each file format. However, in this case, it is necessary to record a reproducible file format for each product type.

At Step SB8 a price for each quality, determined at Step SB7, of music data reproducible at the user terminal 4 which requested for the music data is determined. Thereafter, the flow advances to next Step SB9. In determining the price for each quality, a table storing the price for each quality may be used, or a base price may be set to calculate from the base price the price for each quality by using a predetermined calculation method. In this embodiment, the price for each quality is recorded in a conversion table shown in FIG. 6C to be described later.

At Step SB9 the music data related information is transmitted to the user terminal 4 via the Internet 3 to prompt the user to purchase music data. The music data related information contains the quality of music data purchasable by the user determined at Step SB7 and the price for each quality of the music data set at Step SB8. The transmitted music data related information is displayed as the quality list window shown in FIG. 4B or 4C to be described later. Thereafter, the flow advances to next Step SB10.

At Step SB10 in response to an input (at Step SA5) of commodity purchase information from the user terminal 4, a file for displaying at the user terminal 4 a charging information input window such as shown in FIG. 4D to be described later is transmitted to prompt the user to enter the charging information. Thereafter, the flow advances to Step SB11.

At Step SB11 the management server receives the charging information transmitted from the user terminal 4 at Step SA6 of the user terminal side process, and executes a charging process in accordance with the received charging information. Thereafter, the flow advances to next Step SB12.

At Step SB12 in accordance with the information on the commodity determined at Step SA5 of the user terminal side process and received at Step SB10 from the user terminal 4, the music data of the quality determined at Step SA5 of the user terminal side process is created from the original music data MO stored in the external storage unit 16 (FIG. 2), by referring to a conversion table shown in FIG. 6C. Thereafter, the flow advances to Step SB13.

As shown in FIG. 6C, the conversion table includes two types of tables for mobile phones and for electronic musical instruments. Similar to the correspondence table, the table matching the user terminal is used. For example, the conversion table for the mobile phone records information on the quality of music data and a price for each quality of the high, middle and low qualities. The quality information includes the number of reproduction parts, presence/absence of pitch-bend data, presence/absence of tone color data, and presence/absence of score data. In FIG. 6C, a symbol "circle" indicates that the corresponding data is not removed, and a symbol "cross" indicates that the corresponding data is removed.

For example, if the original music data is converted into the music data of the middle quality for a mobile phone, the mobile phone conversion table shown in FIG. 6C is used, and the number of reproduction parts is reduced to two channels, the pitch-bend data in the original music data is removed, and the store data is removed. The tone color data is the same as that in the original music data. The price is 120 Yen.

The conversion table may be a table not only for the mobile phone and electronic musical instrument, but also for other apparatuses capable of reproducing music data. The price for the music data may be stored in the correspondence table shown in FIG. 6B or it may be stored in another table.

At Step SB13 by referring to the correspondence table shown in FIG. 6B, the file format of the created music data is converted into the file format reproducible at the user terminal 4. Thereafter, the flow advances to next Step SB14.

At Step SB14 the music data MD purchased by the user and having the desired quality is transmitted to the user terminal 4 via the Internet 3. The quality of the music data MD was changed at Step SB12, and the file format thereof was changed at Step SB13 to the file format reproducible at the user terminal 4. After the music data MD is transmitted, the flow advances to next Step SB15.

At Step SB15 the management server process is reset to return to Step SB1.

FIGS. 4A to 4D show examples of various display windows used for purchasing music data.

FIG. 4A shows an example of the music program information input window displayed in the music data purchase home page on the display 20 of the user terminal 4. The home page was transmitted from the management server 2 to the user terminal 4 at Step SB2 shown in FIG. 3. The music program information input window is not necessarily required to be displayed in the music data purchase home page, but it may be displayed in another window.

As shown in FIG. 4A, in the music program information input window, a message MG1 such as "designate music program" is displayed to prompt the user to enter the music data request information RI, and a music program name input field 26a for inputting a music program name and a singer name input field 26b for inputting a singer name are disposed.

The music program information input window is further provided with an "OK" switch SW1 for enabling the input data and a "CANCEL" switch SW2 for disabling the input data. These switches SW1 and SW2 are operated with a cursor 38. If the product type name or the like is to be entered from a user, a product type name input field or the like is provided.

A user enters a music program name in the music program name input field 26a and if possible the singer name in the singer name input field 26b, moves the cursor 38 to the "OK" switch SW1, and clicks the cursor 38 with the operation unit such as a mouse. In this manner, the music data request information RI and terminal information TI are transmitted to the management server 2.

FIG. 4B shows an example of the quality list displayed in the music data purchase home page at Steps SA4 and SA5. The quality list was transmitted at Step SB9 shown in FIG. 3 from the management server 2 to the user terminal 4. In the example shown in FIG. 4B, there are three types of purchasable qualities including the high, middle and low qualities of the music data requested at Step SA3. In this embodiment, although the quality list is displayed in the music data purchase home page instead of the music program information input window, it may be displayed in another window.

As shown in FIG. 4B, with the quality list, a message MG2 such as "designate commodity" is displayed to prompt the user to select a commodity, the music program name and user terminal name are displayed for user confirmation, and a commodity list DL of commodities usable at the user terminal is displayed.

Radio buttons SW3a to SW3c are also displayed on the left side of the purchasable qualities including the high, middle and low qualities. The quality list is further provided with an "OK" switch SW1 for enabling the input data and a "CANCEL" switch SW2 for disabling the input data. These switches SW1 and SW2 and radio buttons SW3a to SW3c are operated with a cursor 38.

As a user clicks one of the radio buttons SW3a to SW3c and the "OK" switch SW1 with the operation unit such as a mouse, the commodity is determined.

The display example shown in FIG. 4B is used if the user terminal is of a high performance. In this case, the information of all the qualities from the high quality to low quality is displayed to allow the user to purchase music data of any one of the high to low qualities. If the user terminal is of a middle performance, the terminal can reproduce music data of only the middle and low qualities so that as shown in FIG. 4C, a list DL without the information for the high quality is displayed. The other displayed items are common to those shown in FIG. 4B. If the user terminal can reproduce music data of only one quality, a list DL with the information only for that quality is displayed. Also in this case, the other displayed items are common to those shown in FIG. 4B.

FIG. 4D shows an example of the charging information input window displayed in the music data purchase home page at Steps SA6. The charging information input window was transmitted at Step SB10 shown in FIG. 3 from the management server 2 to the user terminal 4. The charging information input window is not necessarily required to be displayed in the music data purchase home page, but it may be displayed in another window.

As shown in FIG. 4D, in the charging information input window, a message MG3 such as "enter charging information" is displayed to prompt the user to enter charging information, and a charging information input field 26c is displayed for entering charging information. The music program name, quality and price are also displayed for user confirmation. The charging information input window is further provided with an "OK" switch SW1 for enabling the input data and a "CANCEL" switch SW2 for disabling the input data. These switches SW1 and SW2 are operated with a cursor 38.

As a user enters necessary charging information in the charging information input field 26c and clicks the "OK: switch SW1 with the operation unit such as a mouse, the charging information is transmitted to the managing server 2.

Figure 7:
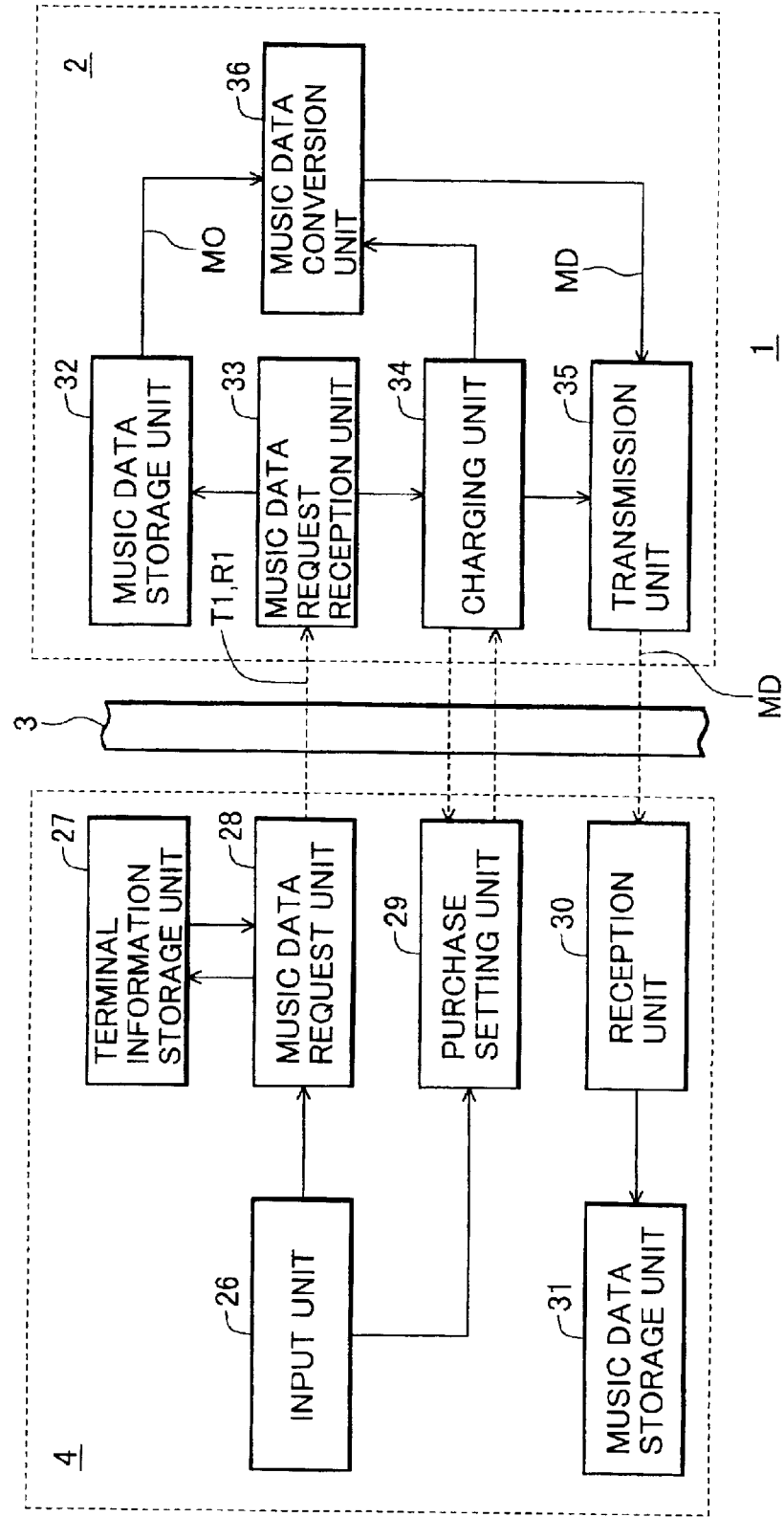
FIG. 7 is a block diagram showing main functions of the music data distribution system 1 having the management server 2, network 3 and user terminal 4.

FIG. 7 is a block diagram showing the main functions of the music data distribution system 1 having the management server 2, network 3 and user terminal 4.

The management server 2 has at least: a music data storage unit 32 for storing the original music data MO; a music data request reception unit 33 for receiving music data request information from the user terminal 4; a charging unit 34 for charging a user; a transmission unit 35 for transmitting the music data MD to the user terminal 4 via the network 3; and a music data conversion unit 36 for converting the original music data MO into the music data MD in accordance with the music data request information of the user or the product type of the user terminal 4.

The user terminal 4 has at least: an input unit 26 for inputting user request and designation, various information necessary for downloading the music data MD, and the like; a terminal information storage unit 27 for storing terminal information to used by the management server 2 to identify the product type or the like of the user terminal 4; a music data request unit 28 for transmitting the music data request information RI and terminal information TI; a purchase setting unit 29 for transmitting and receiving information necessary for the charging process; a reception unit 30 for receiving the music data MD from the management server 2 via the network 3; and a music data storage unit 31 for storing the music data MD received at the reception unit 30.

A user inputs the music data request information RI from the input unit 26 of the user terminal 4. The music data request information input from the input unit 26 is sent to the music data request unit 28. The music data request unit 28 reads the terminal information TI specific to the terminal stored beforehand in the terminal information storage unit 27, and transmits it together with the input music data request information RI to the management server 2 via the network 3.

On the management server 2 side, the music data request reception unit 33 receives the transmitted music data request information RI and terminal information TI. By referring to the music data request information RI, the music data request reception unit 33 checks whether the original music data MO corresponding to the music data request information RI is stored in the music data storage unit 32. If the original music data MO corresponding to the music data request information RI is not stored, this effect is notified to the user terminal 4.

If the original music data MO corresponding to the music data request information RI is stored, the music data request reception unit 33 determines the quality reproducible at the user terminal 4 by referring to the terminal information TI and the correspondence table shown in FIG. 6B, and determines the music data reproducible at the user terminal 4 and its price by referring to the price for each quality recorded in the conversion table shown in FIG. 6C or the like. The determined quality and price are sent to the charging unit.

In accordance with an instruction and information supplied from the music data request reception unit 33, the charging unit 34 transmits the list DL (FIG. 4C) of qualities and prices of the music data to the user terminal 4 and prompts the user to purchase music data.

The purchase setting unit of the user terminal 4 receives the list DL of qualities and prices of the music data and displays it on the display 20 (FIG. 2). By referring to the list DL, the user selects the commodity by operating upon the input unit 26. The input unit 26 sends the information of the commodity selected by the user to the purchase setting unit 29. The purchase setting unit 29 transmits the information on the quality of the purchased music data to the charging unit 34 via the network 3.

Upon reception of the information on the quality of the purchased music data from the purchase setting unit 29, the charging unit 34 prompts the purchase setting unit 29 to transmit the charging information, and instructs the music data conversion unit 36 to prepare the music data MD. At this time, information on the original music data MO to be converted, the file format to be converted of the music data MD, the quality and the like are also transmitted to the music data conversion unit 36.

In response to the instruction from the charging unit 34, the music data conversion unit 36 reads the original music data MO from the music data storage unit 32. The read original music data MO is converted by using the conversion table shown in FIG. 6C to make the music data MD have the quality requested by the user, and by using the correspondence table shown in FIG. 6B to make the music data have the file format reproducible at the user terminal 4 (the file format matching the user terminal environment). The music data MD converted by the music data conversion unit 36 is sent to the transmission unit 35.

The music data conversion unit 33 may be replaced by a music data selection unit. The music data selection unit selectively reads the requested music data reproducible at the user terminal from the music data storage unit 32. In this case, the music data storage unit 32 stores music data being reproducible at a plurality type of user terminals and corresponding to a plurality type of qualities, for each of a plurality of music programs.

The purchase setting unit 29 prompted to transmit the charging information by the charging unit 34 prompts the user to enter the charging information. The user enters the charging information. The input charging information is transmitted to the charging unit 34 via the network 3.

In accordance with the received charging information, the charging unit 34 performs a process necessary for charging, and instructs the transmission unit 35 to transmit the music data MD to the user terminal 4.

Upon reception of the instruction from the charging unit 34, the transmission unit 35 transmits the music data MD to the user terminal 4 via the network 3.

The reception unit 30 of the user terminal 4 receives the music data MD and sequentially stores it in the music data storage unit 31.

As described above, according to the embodiment of the invention, it is possible to distribute music data recorded by one file format by converting the file format into file formats (e.g., for electronic musical instruments and mobile phones) reproducible at various apparatuses.

Further, according to the embodiment of the invention, irrespective of the product type of the apparatus owned by a user, such as an electronic musical instrument and a mobile phone, proper music data can be purchased with ease.

Still further, according to the embodiment of the invention, music data converted into various qualities (music data having various data amounts) can be distributed.

Furthermore, according to the embodiment of the invention, a user can purchase music data of a desired quality at a reasonable price.

In the embodiment, a user selects one of qualities prepared beforehand for music data. Instead, the music data distribution system may be structured so that a user can select freely the detailed contents of each quality. For example, the detailed contents may be selected to the degree that the user terminal can deal with them (can reproduce the music data with the altered quality contents). In this case, charging is performed in accordance with the altered quality contents.

In this manner, a user can purchase music data having a finer quality desired by the user.

In this embodiment, although the quality of music data is changed depending upon presence/absence of particular musical performance data, the quality of music data may be changed by altering the contents of particular musical performance data.

FIG. 8 shows an example of the conversion table for an electronic musical instrument for converting the contents of particular musical performance data. As shown in FIG. 8, the table records the detailed contents of particular musical performance data for each quality of music data to be converted.

For example, when the original music data MO is converted into the music data MD of the middle quality, although a resolution of sound producing timings is restricted, the original music data MO is converted into the music data having rhythmical sense. For the low quality, the original music data is converted into the music data without rhythmical sense through quantization.

As to the length of a music program, when the original music data MO is converted into the music data MD of the middle quality, an introduction, an interlude, and an ending are shortened, and for the low quality, the original data MO is shortened only to one chorus or to a motif part (main theme of the music).

In this manner, as the quality is lowered, the amount of musical performance data is reduced. Namely, the music data of the low quality has the musical performance data less than that of the music data of the high quality, so that a time taken to download the music data can be shortened.

In the above embodiment, although three qualities and three prices are set for the music data, the number of qualities and prices may be set as desired. For example, four or more qualities may be set and corresponding prices are set finely.

In the embodiment, the original music data MO of the high quality is prepared and the musical performance data amount is reduced to change the quality. Instead, music data of a low quality or middle quality may be used as the original music data MO and some musical performance data is added to improve the quality and create musical data of a higher quality. In this manner, the capacity of the external storage unit of the management server 2 can be reduced.

An audition function of allowing a user to audition a music program of each quality before purchasing it may be provided. Since the user can check the contents and quality of music data desired to purchase, the proper quality can be selected more easily.

In this case, Steps SB12 and SB13 are performed between Steps SB9 and SB10 to convert the quality and file format of requested music data and allow the user to audition the music program. It is not necessary to convert all of the music data for audition, but only a portion thereof may be converted.

Also in the embodiment, although a computer or portable data terminal is used as the user terminal (information communication terminal), other apparatus may also be used so long as they have an automatic performance function and a display. For example, an electronic musical instrument with a keyboard, a mobile phone with a tone generator, a karaoke apparatus, a game apparatus, an automatic performance piano or the like may also be used. The type of an electronic musical instrument is not limited only to a keyed musical instrument, but other types may also be used such as a stringed instrument, a wind instrument and a percussion instrument. The electronic musical apparatus is not limited only to an electronic musical instrument of the type that the components thereof such as a tone generator and an automatic performance apparatus are all built in one integrated body, but these components may be discrete and interconnected by communication devices such as MIDI and various networks.

The embodiment may be realized by a commercially available general computer installed with the computer program and the like realizing the functions of the embodiment.

In such a case, the computer program and the like realizing the embodiment functions may be stored in a computer readable storage medium such as a CD-ROM and a floppy disc and supplied to users.

If a general purpose computer or personal computer is connected to a communication network such as a LAN, the Internet and a telephone line, the computer program and various data may be supplied to the general purpose computer or personal computer via the communication network.

The present invention has been described in connection with the preferred embodiments. The invention is not limited only to the above embodiments. It is apparent that various modifications, improvements, combinations, and the like can be made by those skilled in the art.

What are claimed are:

1. A music data distribution apparatus connected to a network for distributing music data to an external device, the apparatus comprising:

a storage device that stores a plurality of music data;

a first receiver that receives music data distribution request and terminal identification information from the external device connected to the network, wherein the music data distribution request comprises music data identification information for specifying a desired music and the terminal identification information is information specifying a product type of the external device;

a searching device that searches music data corresponding to the desired music from the plurality of the music data stored in the storage device in accordance with the music data identification information;

a determining device that determines at least one quality of music data that can be used by the external device for the searched music data in accordance with the terminal identification information;

a first transmitter that transmits information regarding to the determined quality of the searched music data to the external device;

a second receiver that receives selection information regarding to selection of the quality from the determined quality of the searched music data from the external device;

a converter that converts the searched music data to music data having the selected quality in accordance with the received selection information; and a second transmitter that transmits the converted music data having the selected quality to the external device.

2. The music data distribution apparatus according to claim 1, wherein the converter converts the searched music data to music data having the selected quality by reducing a data amount of the searched music data.

3. The music data distribution apparatus according to claim 1, further comprising:
   a price determining device that determines a price for the music data in accordance with the quality of the music data; and
   a charging device that charges the price determined by the price determining device to a user of the external device for the converted music data having the selected quality to be transmitted by the second transmitter.

4. The music data distribution apparatus according to claim 1, wherein:
   the converter further converts a file format of the converted music data having the selected quality to a file format that the external device can reproduce; and
   the second transmitter transmits the converted music data having the selected quality in the reproducible file format to the external device.

5. The music data distribution apparatus according to claim 4, further comprising:
   a price determining device that determines a price for the music data in accordance with the quality and the file format of the music data; and
   a charging device that charges the price determined by the price determining device to a user of the external device for the converted music data having the selected quality in the reproducible file format to be transmitted by the second transmitter.

6. The music data distribution apparatus according to claim 4, wherein the file format of the music data stored in the storage device is a file format that an electronic musical instrument can reproduce, and the file format of the music data to be transmitted to the external device is a file format that a mobile phone can reproduce.

7. The music data distribution apparatus according to claim 1, further comprising a price determining device that determines a price for the music data having the determined quality or each of qualities of the music data, and wherein
   the information transmitted by the first transmitter further comprises information regarding to the price or prices determined by the price determining device.

8. A music data distribution method for distributing music data to an external device via a network, the method comprising the steps of:
   (a) receiving a music data distribution request and terminal identification information from the external device connected to the network, wherein the music data distribution request comprises music data identification information for specifying a desired music and the terminal identification information is information specifying a product type of the external device;
   (b) searching music data corresponding to the desired music from a plurality of the music data stored in a storage device in accordance with the music data identification information;
   (c) determining at least one quality of qualities of music data that can be used by the external device for the searched music data in accordance with the terminal identification information;
   (d) transmitting information regarding to the determined quality of the searched music data to the external device;
   (e) receiving selection information regarding to selection of the quality from the determined quality of the searched music data from the external device;
   (f) converting the searched music data to music data having the selected quality in accordance with the received selection information; and
   (g) transmitting the converted music data having the selected quality to the external device.

9. A program which a computer executes to realize a music data distribution process for distributing music data to an external device via a network, comprising the instructions for:
   (a) receiving a music data distribution request and terminal identification information from the external device connected to the network, wherein the music data distribution request comprises music data identification information for specifying a desired music and the terminal identification information is information specifying a product type of the external device;
   (b) searching music data corresponding to the desired music from a plurality of the music data stored in a storage device in accordance with the music data identification information;
   (c) determining at least one quality of music data that can be used by the external device for the searched music data in accordance with the terminal identification information;
   (d) transmitting information regarding to the determined quality of the searched music data to the external device;
   (e) receiving selection information regarding to selection of the quality from the determined quality of the searched music data from the external device;
   (f) converting the searched music data to music data having the selected quality in accordance with the received selection information; and
   (g) transmitting the converted music data having the selected quality to the external device.

* * * * *